(12) United States Patent
Berjot et al.

(10) Patent No.: US 12,522,366 B2
(45) Date of Patent: Jan. 13, 2026

(54) FRONT ENGINE ATTACHMENT SYSTEM INTENDED FOR AN AIRCRAFT ENGINE AND HAVING A COMPACT STRUCTURE

(71) Applicant: Airbus Operations SAS, Toulouse (FR)

(72) Inventors: Michael Berjot, Toulouse (FR); Rémi Lansiaux, Toulouse (FR); Jean-Baptiste Vignes, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/755,122

(22) Filed: Jun. 26, 2024

(65) Prior Publication Data
US 2025/0002166 A1    Jan. 2, 2025

(30) Foreign Application Priority Data

Jun. 28, 2023 (FR) ...................................... 2306782

(51) Int. Cl.
*B64D 27/40* (2024.01)

(52) U.S. Cl.
CPC ......... *B64D 27/404* (2024.01); *B64D 27/406* (2024.01)

(58) Field of Classification Search
CPC ..... B64D 27/40; B64D 27/404; B64D 27/406
See application file for complete search history.

(56) References Cited

U.S. PATENT DOCUMENTS

| | | | |
|---|---|---|---|
| 5,474,258 A | 12/1995 | Taylor et al. | |
| 7,789,344 B2 | 9/2010 | Cousin et al. | |
| 8,167,238 B2 * | 5/2012 | Gardes | B64D 27/402 60/797 |
| 8,573,848 B2 * | 11/2013 | Larrochelle | F16C 23/04 244/54 |
| 8,894,034 B2 * | 11/2014 | Rogero | B64D 27/404 248/666 |
| 9,248,921 B2 * | 2/2016 | West | B64D 27/404 |
| 11,618,579 B2 * | 4/2023 | Gueneau | B64C 3/187 244/54 |
| 12,344,388 B2 * | 7/2025 | Ridray | B64D 27/402 |
| 12,377,992 B2 * | 8/2025 | Tulloch | B64D 27/18 |

(Continued)

FOREIGN PATENT DOCUMENTS

| | | |
|---|---|---|
| EP | 3945032 A1 | 2/2022 |
| FR | 2905932 A1 | 3/2008 |

(Continued)

OTHER PUBLICATIONS

French Search Report for corresponding French Patent Application No. 2306782 dated Dec. 8, 2023.

*Primary Examiner* — Joshua J Michener
*Assistant Examiner* — Michael B. Kreiner
(74) *Attorney, Agent, or Firm* — Greer, Burns & Crain Ltd.

(57) ABSTRACT

A front engine attachment system for an engine having an engine pylon with a nose having a male clevis and a cylindrical stud, two links that are fastened to the engine by a second ball-joint connection about a second axis, a first shaft establishing a first ball-joint connection of the links to the male clevis about a first axis, wherein the first axis and the second axis are in the same vertical plane, and wherein the cylindrical stud is mounted so as to be able to move, via an annular linear connection, with respect to the front casing.

6 Claims, 4 Drawing Sheets

(56) References Cited

U.S. PATENT DOCUMENTS

| | | |
|---|---|---|
| 2010/0090056 A1 | 4/2010 | Gardes et al. |
| 2010/0147996 A1 | 6/2010 | Hartshorn et al. |
| 2022/0033098 A1 | 2/2022 | Frenot et al. |

FOREIGN PATENT DOCUMENTS

| | | |
|---|---|---|
| FR | 3098793 A1 | 1/2021 |
| FR | 3103788 A1 | 6/2021 |
| GB | 2119857 A | 11/1983 |
| WO | 9311041 A1 | 6/1993 |

* cited by examiner

FRONT ENGINE ATTACHMENT SYSTEM INTENDED FOR AN AIRCRAFT ENGINE AND HAVING A COMPACT STRUCTURE

CROSS-REFERENCES TO RELATED APPLICATIONS

This application claims the benefit of French Patent Application Number 2306782 filed on Jun. 28, 2023, the entire disclosure of which is incorporated herein by way of reference.

FIELD OF THE INVENTION

The present invention relates to a front engine attachment system for an aircraft engine in which the front engine attachment system is compact, and to an aircraft having at least one such front engine attachment.

BACKGROUND OF THE INVENTION

An aircraft conventionally has at least one engine, in particular a jet engine. Beneath each wing, and for each engine, the aircraft has an engine pylon that is fastened to the structure of the wing and that extends below the wing, and the engine is suspended beneath the engine pylon.

The engine is housed in a nacelle and fastened to the engine pylon by way of an engine attachment system comprising a front engine attachment and a rear engine attachment.

There are numerous types of front engine attachment that are satisfactory from the point of view of their current use. However, the fans of new engines are increasingly large so as to improve the performance of the engines, and this correspondingly reduces the distance between the nacelle and the ground.

It is then necessary to define a new arrangement that makes it possible to reduce the height of the front engine attachment so as to move the nacelle away from the ground and consequently to bring the nacelle closer to the wing.

SUMMARY OF THE INVENTION

One object of the present invention is to propose a front engine attachment system that incorporates the engine pylon and the front engine attachment so as to reduce the height of the assembly.

To this end, a front engine attachment system for an engine of an aircraft is proposed, the front engine attachment system having a vertical median plane and having:
- an engine pylon having, at a front part, a nose having a male clevis and a cylindrical stud that is cylindrical about a vertical axis and intended to be mounted so as to be able to move, via an annular linear connection, about the vertical axis with respect to a front casing of the engine,
- two links, which are intended to be fastened to the front casing by a second ball-joint connection about a second axis perpendicular to the median plane, the two links being arranged on either side of the male clevis, and
- a first shaft, which is perpendicular to the median plane and establishes a first ball-joint connection of the links to the male clevis about a first axis, wherein the first axis and the second axis are in the same vertical plane perpendicular to the median plane.

Such a front engine attachment system has reduced vertical bulk since the front engine attachment is incorporated in the engine pylon.

Advantageously, the first axis is arranged to the rear of the vertical axis.

Advantageously, each link consists of two adjoining links.

Advantageously, the nose consists of two fittings that are fastened to one another, and the cylindrical stud consists of two half-cylinders adjoining the vertical median plane, wherein each half-cylinder belongs to one of the fittings of the nose.

Advantageously, the first shaft consists of a first peripheral shaft, which is hollow, and of a first inner shaft, which is fitted within the first peripheral shaft.

The invention also proposes an aircraft having an engine with a front casing and a front engine attachment system according to one of the variants, wherein the links are fastened to the front casing by the second ball-joint connection and wherein the cylindrical stud is mounted so as to be able to move, via the annular linear connection, about the vertical axis with respect to the front casing.

BRIEF DESCRIPTION OF THE DRAWINGS

The above-mentioned features of the invention, along with others, will become more clearly apparent upon reading the following description of one exemplary embodiment, said description being given with reference to the appended drawings, in which.

DETAILED DESCRIPTION OF THE PREFERRED EMBODIMENTS

Figure 1:
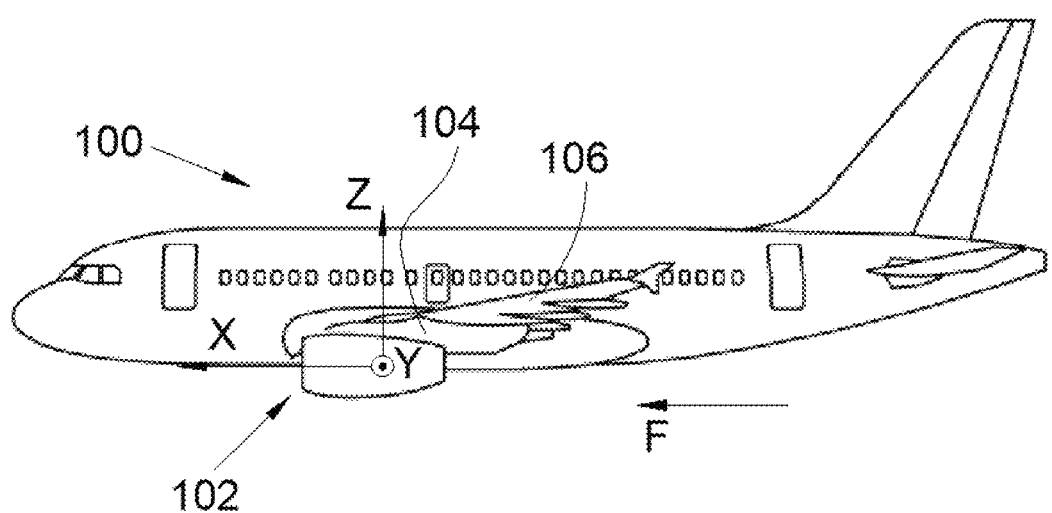
FIG. 1 is a side view of an aircraft according to the invention.

In the following description, terms relating to a position are considered in relation to an aircraft in a position of forward movement, i.e. as shown in FIG. 1, in which the arrow F represents the direction of forward movement.

FIG. 1 shows an aircraft 100 that has an engine 102, in particular a jet engine that is fastened beneath an engine pylon 104 that is itself fastened beneath a wing 106.

In the following description, and by convention, X denotes the longitudinal direction of the engine 102, with positive orientation in the direction of forward movement of the aircraft 100, Y denotes the transverse direction of the engine 102, which is horizontal when the aircraft 100 is on the ground, and Z denotes the vertical direction or vertical height when the aircraft 100 is on the ground, these three directions X, Y and Z being mutually orthogonal.

The engine 102 has a general shape exhibiting symmetry of revolution about the longitudinal axis X.

In the embodiment of the invention presented in FIG. 1, the aircraft 100 has one engine 102 beneath each wing 106 of the aircraft 100, but it is possible to provide a plurality of engines beneath each wing 106.

Figure 2:
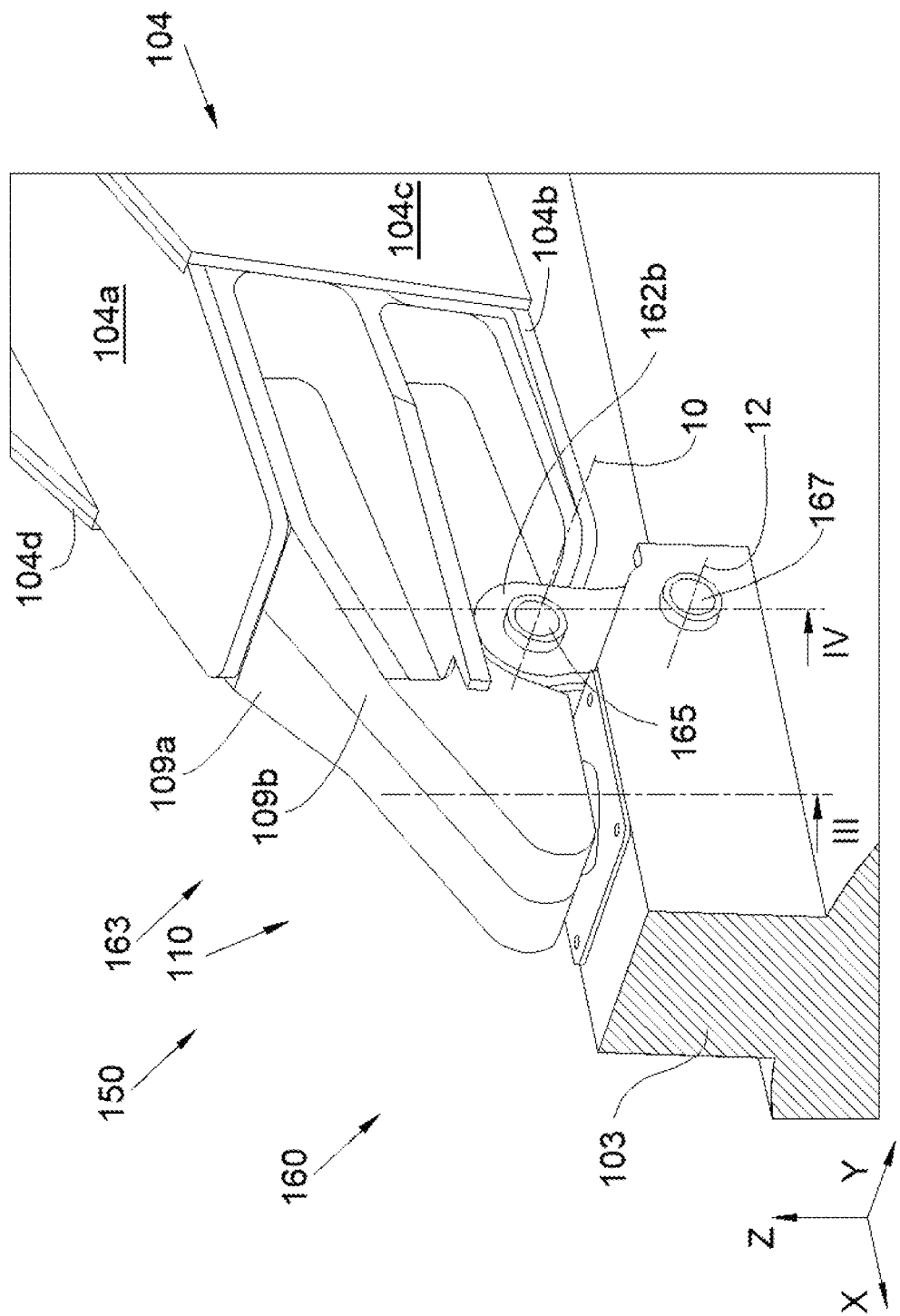
FIG. 2 is a perspective view of a front engine attachment system according to the invention.
Figure 3:
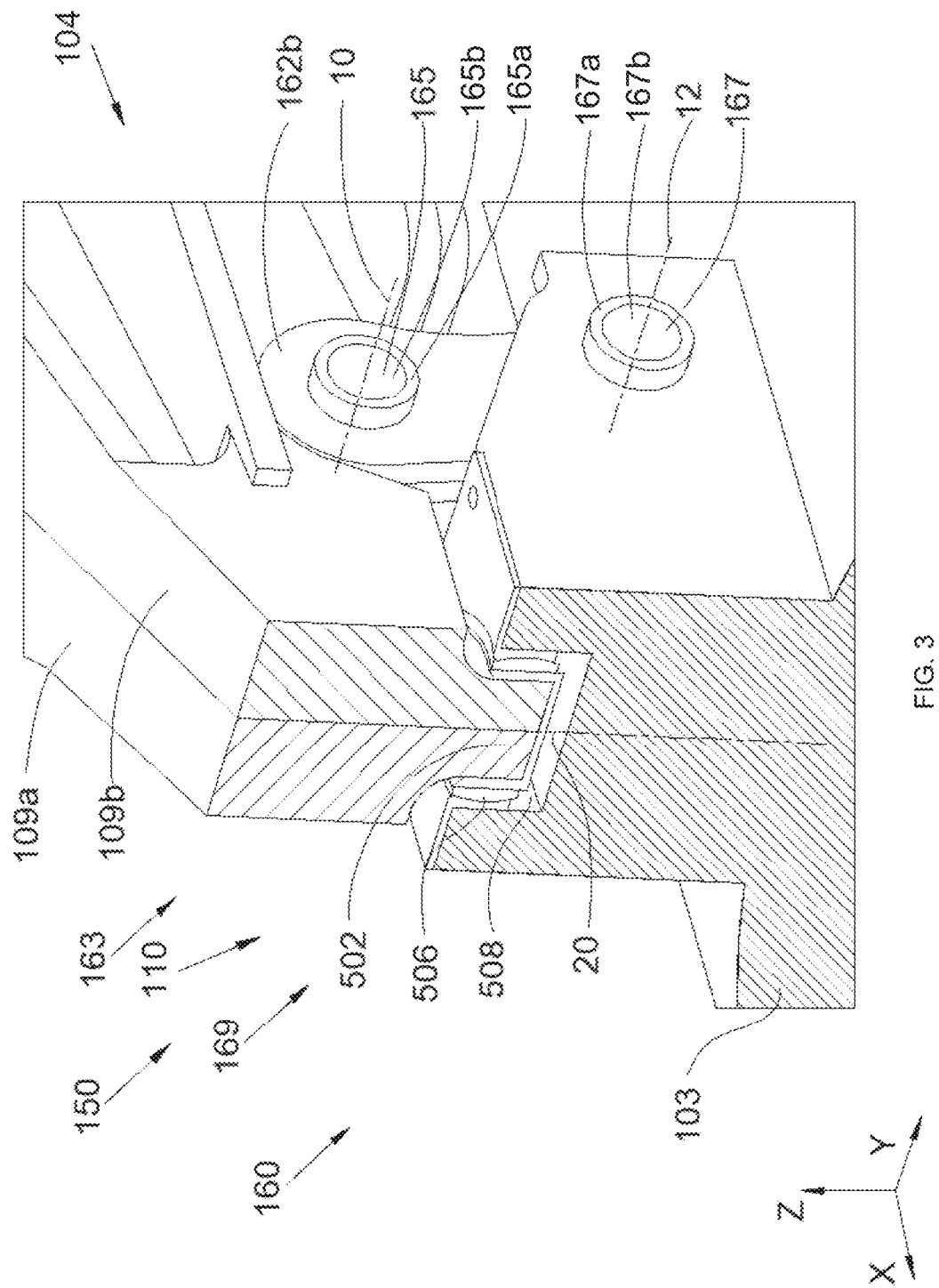
FIG. 3 is a perspective view of a cross section of the front engine attachment system according to the invention along the line III in FIG. 2.
Figure 4:
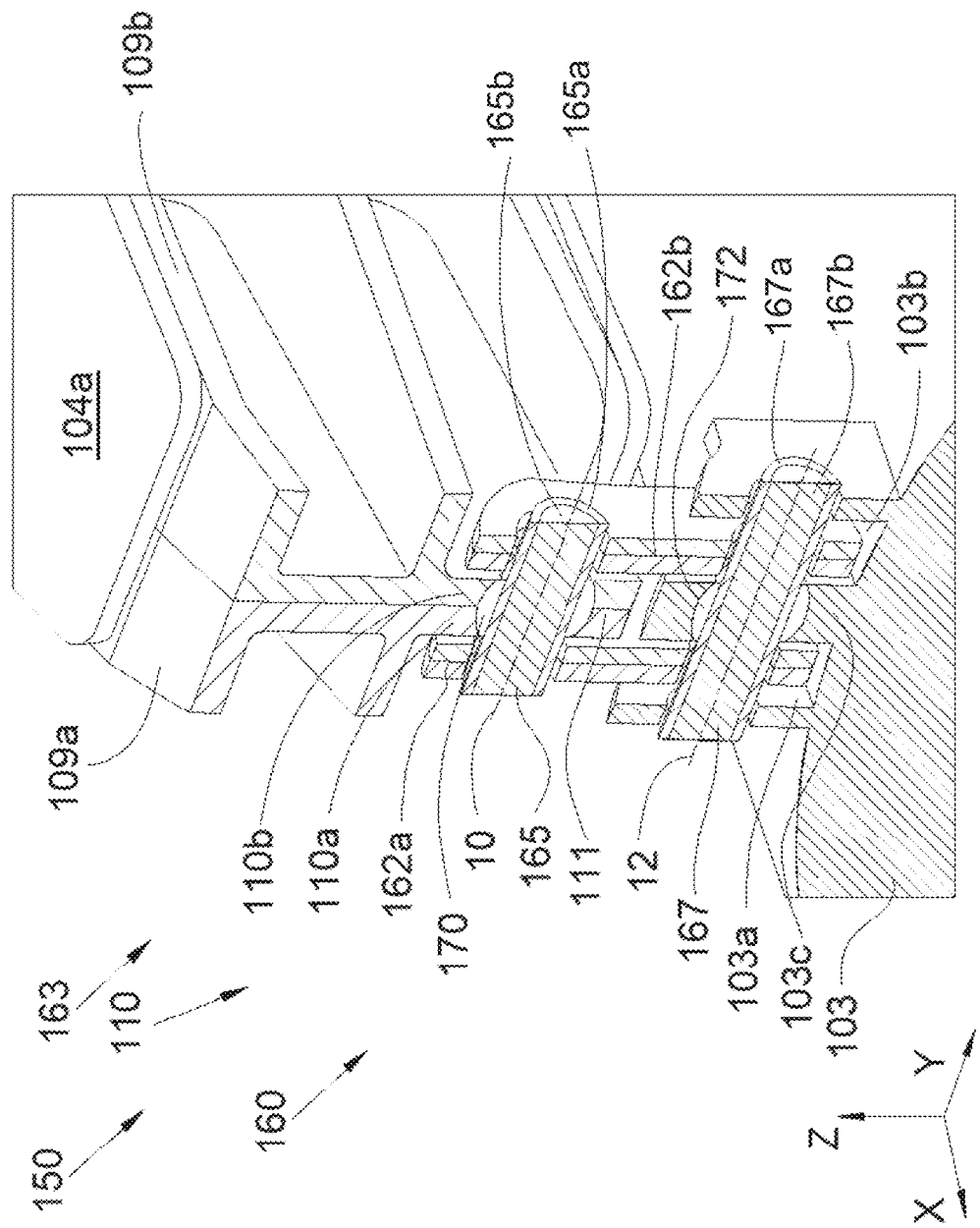
FIG. 4 is a perspective view of a cross section of the front engine attachment system according to the invention along the line IV in FIG. 2.

FIG. 2 shows a front engine attachment system 150 that is fastened to the structure of the aircraft 100, in this case the structure of the wing 106, and extends beneath the wing 106 and supports the engine 102 and in particular the front part of the engine 102. FIGS. 2 to 4 show various views of the front engine attachment system 150.

The front engine attachment system 150 comprises the engine pylon 104, which is fastened to the structure of the wing 106, and a front engine attachment 160, which is fastened between the engine pylon 104 and a front casing 103 secured to the engine 102. The front engine attachment system 150 has a vertical median plane XZ.

Conventionally, a rear engine attachment is fastened between the engine pylon 104 and a rear part of the engine 102 and it can take any form known to those skilled in the art.

The engine pylon 104 takes the form of a box, which has, inter alia, at a front part 163, a nose 110 that has a male clevis 111. As specified below, the male clevis 111 (FIG. 4) is arranged between two links 162a-b that are arranged on either side of the male clevis 111 and that thus form a female clevis in which the male clevis 111 is mounted so as to be free to rotate about a first axis 10 that is oriented transversely, i.e. perpendicularly to the median plane XZ and therefore horizontally so as to establish a ball-joint connection, referred to as first ball-joint connection, a main axis of rotation of which is the first axis 10 and wherein the rotations about the other two axes are of reduced amplitude.

In the embodiment of the invention presented in FIGS. 2 to 4, the nose 110 consists of two fittings 109a-b that are fastened to one another, in this case at the median plane XZ.

The male clevis 111 in this case consists of two walls 110a-b, which are parallel to one another and vertical, i.e. parallel to the median plane XZ and therefore perpendicular to the transverse direction Y. The two walls 110a-b adjoin at the median plane XZ in order to form the male clevis 111, and each wall 110a-b constituting the male clevis 111 belongs to one of the fittings 109a-b.

FIG. 4 shows a cross section through the male clevis 111 and the two female clevises 103a-b.

The engine pylon 104 has an upper wall 104a, a lower wall 104b and two side walls 104c-d. The various walls 104a-d are secured to one another so as to form a box with a generally trapezoidal vertical cross section. The nose 110 is fastened at the front zone 163 of the engine pylon 104 by any known means, such as for example by welding or bolts. The front zone 163 corresponds to the front ends of the walls 104a-d.

The front engine attachment 160 has the two links 162a-b, which are fastened to the nose 110 by the male clevis 111 and, as specified above, arranged on either side of the male clevis 111 and in this case symmetrically with respect to the median plane XZ. The first ball-joint connection of the links 162a-b to the male clevis 111 is established by a first shaft 165, which is equipped with a boss 170 on which the male clevis 111, i.e. the two walls 110a-b forming the male clevis 111, is mounted in an articulated manner. The first shaft 165 thus passes through the male clevis 111 and the links 162a-b through the bores provided for this purpose. The first shaft 165 is thus perpendicular to the median plane XZ. The first axis 10 constitutes the axis of the first shaft 165.

Each link 162a-b is also fastened in an articulated manner to the front casing 103 by a second ball-joint connection, a main axis of rotation of which is a second axis 12 that is perpendicular to the median plane XZ and therefore horizontal and wherein the rotations about the other two axes are of reduced amplitude. To this end, the front casing 103 has the female clevises 103a-b, which also each consist of two walls that are parallel to one another and vertical, i.e. parallel to the median plane XZ. Two of the walls constituting the female clevises 103a-b are in this case common to the two female clevises 103a-b in order to form a single central wall 103c, namely the middle wall. The female clevises 103a-b are symmetrical with respect to the median plane XZ.

The links 162a-b are fastened to the female clevises 103a-b by a second shaft 167 that passes through the walls forming the female clevises 103a-b and the links 162a-b through bores provided for this purpose. The second shaft 167 is thus perpendicular to the median plane XZ. The second axis 12 constitutes the axis of the second shaft 167. The second ball-joint connection of the links 162a-b to the front casing 103 is established by the second shaft 167, which is equipped with a boss 172 on which the front casing 103 is mounted in an articulated manner, in this case by way of the central wall 103c.

The second axis 12 is vertically aligned with the first axis 10 and beneath the latter, i.e. the axis of the second shaft 167 and the axis of the first shaft 165 are in the same vertical plane perpendicular to the longitudinal direction X and therefore to the median plane XZ, or in other words, the main axis of the first ball-joint connection, i.e. the first axis 10, and the main axis of the second ball-joint connection, i.e. the second axis 12, are in the same vertical plane perpendicular to the median plane XZ.

FIG. 3 shows a cross section through an annular linear connection in which the translation axis is a vertical axis 20, which is also referred to as a "spigot connection" 169.

The nose 110 has a cylindrical stud 502 that is coaxial with the vertical axis 20, which is therefore oriented vertically and in this case in the vertical median plane XZ. In the embodiment of the invention presented in FIG. 3, the stud 502 consists of two half-cylinders adjoining the vertical median plane XZ so as to form the cylindrical stud 502, and each half-cylinder belongs to one of the fittings 109a-b of the nose 110.

The cylindrical stud 502 extends downwards and is mounted so as to be able to move, via an annular linear connection, about the vertical axis 20 with respect to the front casing 103. There is therefore a ball-joint connection about a main axis that is the vertical axis 20 between the cylindrical stud 502 and the front casing 103, and therefore between the nose 110 and the front casing 103. There is also a sliding connection, the direction of which is parallel to the vertical axis 20.

In the embodiment of the invention presented in FIG. 3, the ball-joint connection is established by installing a boss 506 that is mounted around the cylindrical stud 502 and on which the front casing 103 is mounted in an articulated manner. The boss 506 is between the cylindrical stud 502 and the front casing 103 in which a drilled hole 508 is formed in order to allow the boss 506 to be installed.

The sliding connection is formed between the cylindrical stud 502 and the boss 506, which is therefore mounted so as to be free to move in translation along the cylindrical stud 502 parallel to the vertical axis 20.

The male clevis 111 is arranged to the rear of the spigot connection 169 with respect to the longitudinal direction X, i.e. the first axis 10 of the first ball-joint connection is to the rear of the vertical axis 20.

With such an arrangement, the pylon 104 directly incorporates the elements ensuring the fastening of the engine 102 so as to reduce the height required for this fastening.

When the engine 102 is in operation, forces are generated and they are transmitted to the structure of the wing through the front casing 103 and the front engine attachment system 150, i.e. through the links 162a-b, the second shaft 167, the first shaft 165, the spigot connection 169 and the engine pylon 104, which form a primary force path.

The forces in the Z direction are thus transmitted through the second ball-joint connection and the first ball-joint connection, i.e. vertically through the links 162*a-b*.

The forces in the X direction and in the Y direction are transmitted through the spigot connection 169.

For safety reasons, the front engine attachment system 150 also has means that ensure secondary force paths that compensate for failure of the primary force path, these means constituting backup safety means (or "waiting fail-safe" means).

In the event of failure, it is necessary to continue to transmit the forces in the Z direction. Thus, according to one particular embodiment of the invention, each link 162*a-b* consists of two adjoining links.

In the event of failure at the spigot connection 169, it is necessary to continue to transmit the forces in the Y direction. Thus, as specified above, the cylindrical stud 502 consists of two half-cylinders adjoining the vertical median plane XZ, and each half-cylinder belongs to one of the fittings 109*a-b* of the nose 110. Thus, in the event of failure of one of the half-cylinders, the other remains operational.

In the event of failure, it is necessary to continue to transmit the forces in the Z direction. Thus, according to one particular embodiment of the invention, the first shaft 165 consists of a first peripheral shaft 165*a*, which is cylindrical and hollow, and of a first inner shaft 165*b*, which is fitted within the first peripheral shaft 165*a*. Such an arrangement makes it possible to compensate for any breakage of the first peripheral shaft 165*a*.

Likewise, the second shaft 167 consists of a second peripheral shaft 167*a*, which is cylindrical and hollow, and of a second inner shaft 167*b*, which is fitted within the second peripheral shaft 167*a*. Such an arrangement makes it possible to compensate for any breakage of the first peripheral shaft 165*a*.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A front engine attachment system for an engine of an aircraft, the front engine attachment system having a vertical median plane and comprising:
   an engine pylon having, at a front part, a nose having a male clevis and a cylindrical stud that is cylindrical about a vertical axis and configured to be mounted so as to move, via an annular linear connection, about the vertical axis with respect to a front casing of the engine,
   two links, which are configured to be fastened to the front casing by a second ball-joint connection about a second axis perpendicular to the vertical median plane, the two links being arranged on either side of the male clevis, and
   a first shaft, which is perpendicular to the vertical median plane and forms a first ball-joint connection of the two links to the male clevis about a first axis,
   wherein the first axis and the second axis are in the same vertical plane perpendicular to the vertical median plane.

2. The front engine attachment system according to claim 1, wherein the first axis is arranged towards a rear of the vertical axis.

3. The front engine attachment system according to claim 1, wherein each link comprises two adjoining links.

4. The front engine attachment system according to claim 1, wherein the nose comprises two fittings that are fastened to one another, and
   wherein the cylindrical stud comprises two half-cylinders adjoining the vertical median plane, wherein each half-cylinder belongs to one of the fittings of the nose.

5. The front engine attachment system according to claim 1, wherein the first shaft comprises a first peripheral shaft, which is hollow, and a first inner shaft, fitted within the first peripheral shaft.

6. An aircraft comprising:
   an engine with a front casing and
   the front engine attachment system according to claim 1,
   wherein the links are fastened to the front casing by the second ball-joint connection, and
   wherein the cylindrical stud is mounted to move, via the annular linear connection, about the vertical axis with respect to the front casing.

* * * * *